US006560717B1

(12) United States Patent
Scott et al.

(10) Patent No.: US 6,560,717 B1
(45) Date of Patent: May 6, 2003

(54) METHOD AND SYSTEM FOR LOAD BALANCING AND MANAGEMENT

(75) Inventors: James Allan Scott, Brighton, MA (US); Jeffrey J. Vroom, Jamaica Plain, MA (US)

(73) Assignee: Art Technology Group, Inc., Cambridge, MA (US)

( * ) Notice: Subject to any disclaimer, the term of this patent is extended or adjusted under 35 U.S.C. 154(b) by 0 days.

(21) Appl. No.: 09/457,880

(22) Filed: Dec. 10, 1999

(51) Int. Cl.[7] ................................................ G06F 9/00
(52) U.S. Cl. ............................. 714/4; 714/47; 709/105
(58) Field of Search ........................... 714/4, 47, 1, 37; 709/105, 102, 104, 226

(56) References Cited

U.S. PATENT DOCUMENTS

| | | | | |
|---|---|---|---|---|
| 5,283,897 A | * | 2/1994 | Georgiadis et al. | 709/105 |
| 5,898,870 A | * | 4/1999 | Okuda et al. | 709/104 |
| 6,026,425 A | * | 2/2000 | Suguri et al. | 709/105 |
| 6,178,160 B1 | * | 1/2001 | Bolton et al. | 370/255 |
| 6,199,065 B1 | * | 3/2001 | Kenyon | 707/10 |
| 6,249,801 B1 | * | 6/2001 | Zisapel et al. | 709/105 |
| 6,330,605 B1 | * | 12/2001 | Christensen et al. | 709/226 |
| 6,353,847 B1 | * | 3/2002 | Maruyama et al. | 707/10 |
| 6,363,461 B1 | * | 3/2002 | Pawlowski et al. | 711/154 |
| 6,374,297 B1 | * | 4/2002 | Wolf et al. | 707/10 |
| 6,401,121 B1 | * | 6/2002 | Yoshida et al. | 709/105 |

OTHER PUBLICATIONS

Chao–Ju Hou et al: Load Sharing with Consideration of Future Task Arrivals in Heteroneneous Distributed Real–Time Systems, IEEE Transactions on Computer, IEEE Inc., New York, US, vol. 43, No. 9, Sep. 1, 1994, pp. 1076–1090.

Goswami K K et al: "Prediction–Based Dynamic Load–Sharing Heuristics", IEEE Transactions on Parallel and Distributed Systems, IEEE Inc., New York, US, vol. 4, No. 6, Jun. 1, 1993, pp. 638–648.

Colajanni M et al: "Analysis of Task Assignment Policies in Scalable Distributed Web–Server Systems", IEEE Transactions on Parallel and Distributed Systems, IEEE Inc., New York, US, vol. 9, No. 6, Jun. 1, 1998, pp. 585–599.

* cited by examiner

Primary Examiner—Robert Beausoliel
Assistant Examiner—Gabriel L. Chu
(74) Attorney, Agent, or Firm—Hale and Dorr LLP (57) ABSTRACT

A computer system for a web site uses load balancing of new sessions based on measurements and estimates of past, present, and future performance, using the average time each application server takes to respond to a request (the latency) and the number of active sessions on each application server. Generally, once assigned to a session, an application server handles all future requests relating to that session. However, if the load or performance of an application server becomes sufficiently degraded, a failover mechanism causes future requests to be handled by a different application server until the performance improves. Under extreme circumstances, an application server will be restarted. If a web or HTTP server is unable to have requests served by any application server, future requests may be redirected to another web server.

6 Claims, 5 Drawing Sheets

Load Information:

| Server | # Req's | # Sessions | Mem Usage | Time | Avail. Flag |
|---|---|---|---|---|---|
| 1 | 20,000 | 140 | 6,500,000 | 1999-02-10 14:48:45 | false |
| 2 | 15,000 | 130 | 7,000,000 | 1999-02-10 14:48:50 | false |
| 3 | 18,000 | 180 | 9,000,000 | 1999-02-10 14:48:55 | true |
| 4 | 16,000 | 150 | 7,000,000 | 1999-02-10 14:49:00 | false |

Status and Load Table:

| Application Server | Status | Probability |
|---|---|---|
| 1 | OK | 0.35 |
| 2 | OK | 0.30 |
| 3 | OK | 0.15 |
| 4 | OK | 0.20 |

METHOD AND SYSTEM FOR LOAD BALANCING AND MANAGEMENT

FIELD OF THE INVENTION

This invention relates to computer systems and, more particularly, to servers for Internet web sites.

BACKGROUND OF THE INVENTION

In the use of the Internet, users may contact an Internet web site to view or obtain information. The user's contact with the web site is typically with a web server, or Hyper Text Transfer Protocol (HTTP) server. Behind and supporting the web server is an application server. A web site intended to handle lots of demand may use multiple web servers and/or multiple application servers.

To a point, adding an application server allows the system to be scaled to handle increased use. Theoretically, the system would scale linearly. For example, by doubling the hardware for the application servers, the system capacity would be doubled.

When using multiple servers, it is useful to use some form of load balancing of the servers. One way to perform load balancing would be to use a round-robin approach, where each new session is assigned, in turn, to the next server. An alternative technique in the prior art is to use a "fair share" load balancing approach. With a fair share approach, each server is assigned an equal portion of a range in which a random number may fall. For example, with 4 servers and the selection of a random number less than one, the first may be assigned 0–0.24, the second may be assigned 0.25–0.49, the third may be assigned 0.5–0.74, and the fourth may be assigned 0.75–0.99. A random number is then selected, and the server within whose range the number falls is assigned the session. That server then hosts the duration of the session.

However, it would be useful to provide load balancing based on measurements, estimates, or predictions of past, present, and/or future load on a server.

SUMMARY OF THE INVENTION

According to the present invention, load balancing of World Wide Web sessions is achieved by taking into account metrics of application server performance. A load manager collects load information from each application server. A new session is assigned to an application server according to a probabilities table, where each application server is assigned a probability by a load balancer and that probability is used by a module within the web or HTTP server to determine the application server assigned to the new session. The load balancer considers measurement, estimates, or predictions of past, present, and future load on a server. In one embodiment, the load balancer considers both latency— for example, the amount of time it takes the server to serve a request—and the number of active sessions running on the server. The load balancer can consider the average latency of requests over a predetermined, but adjustable, polling interval and the number of currently active sessions at the end of the polling interval in assigning the probabilities.

Measurements from prior polling intervals can be factored into the load balancing algorithm, in user-adjustable ways, in order to dampen the effects of short term changes. The weights assigned to the average latency relative to the number of active sessions also can be adjusted. The effects of changing the weights also can be examined.

The load balancer may adjust for extreme high and low loads. In order to avoid distortions when latency or the number of active sessions is relatively low, the load balancer uses a minimum latency value for a server when the server's actual latency falls below a user-defined minimum number. Similarly, the load balancer uses a minimum number of active sessions value for a server when the server's actual number of sessions falls below a user-defined minimum number.

At the other extreme, if the latency exceeds an adjustable maximum level, the application server is considered to be overloaded and assigned a probability of 0, so that future sessions are not assigned to it. Similarly, if the number of active sessions for an application server exceeds an adjustable maximum level, the application server is considered to be overloaded and is assigned a probability of 0.

When the load on an application server is sufficiently high or the performance of an application server is sufficiently degraded, requests related to existing sessions (as opposed to new sessions) are routed to a different server. This failover mechanism may be triggered, for example, in the following three situations. First, if an application server is configured to have a fixed number of handler threads, all of those threads are handling a requests, and all of those threads have neither received nor sent a packet in a configurable time interval, then the failover mechanism is triggered. Second, if the memory usage of a process exceeds a configurable limit, the failover mechanism is triggered. Third, if an attempt to connect to an application server times out after a configurable limit, the failover mechanism is triggered.

The failover mechanism can be implemented in different ways. For example, in the first two failover situations described above, the failover of requests to the application server may be disabled when the conditions for triggering the failover no longer exist. In the third failover situation, attempts to connect may be made after a configurable back-off interval.

As a further mechanism for managing server load, an application server can be restarted automatically under appropriate conditions. For example, an external monitoring process can be used to connect to the application server and request a predefined monitoring page. If the external process fails to receive the page a configurable number of times, it sends a message to the application server to force it to restart. While the server is restarting, it is not available to handle requests.

As yet a further mechanism for managing server load, if a web (or HTTP) server cannot access any of the application servers to which it is connected, it directs the browser which is requesting information to a different web server.

DETAILED DESCRIPTION OF PREFERRED EMBODIMENT

Figure 1:
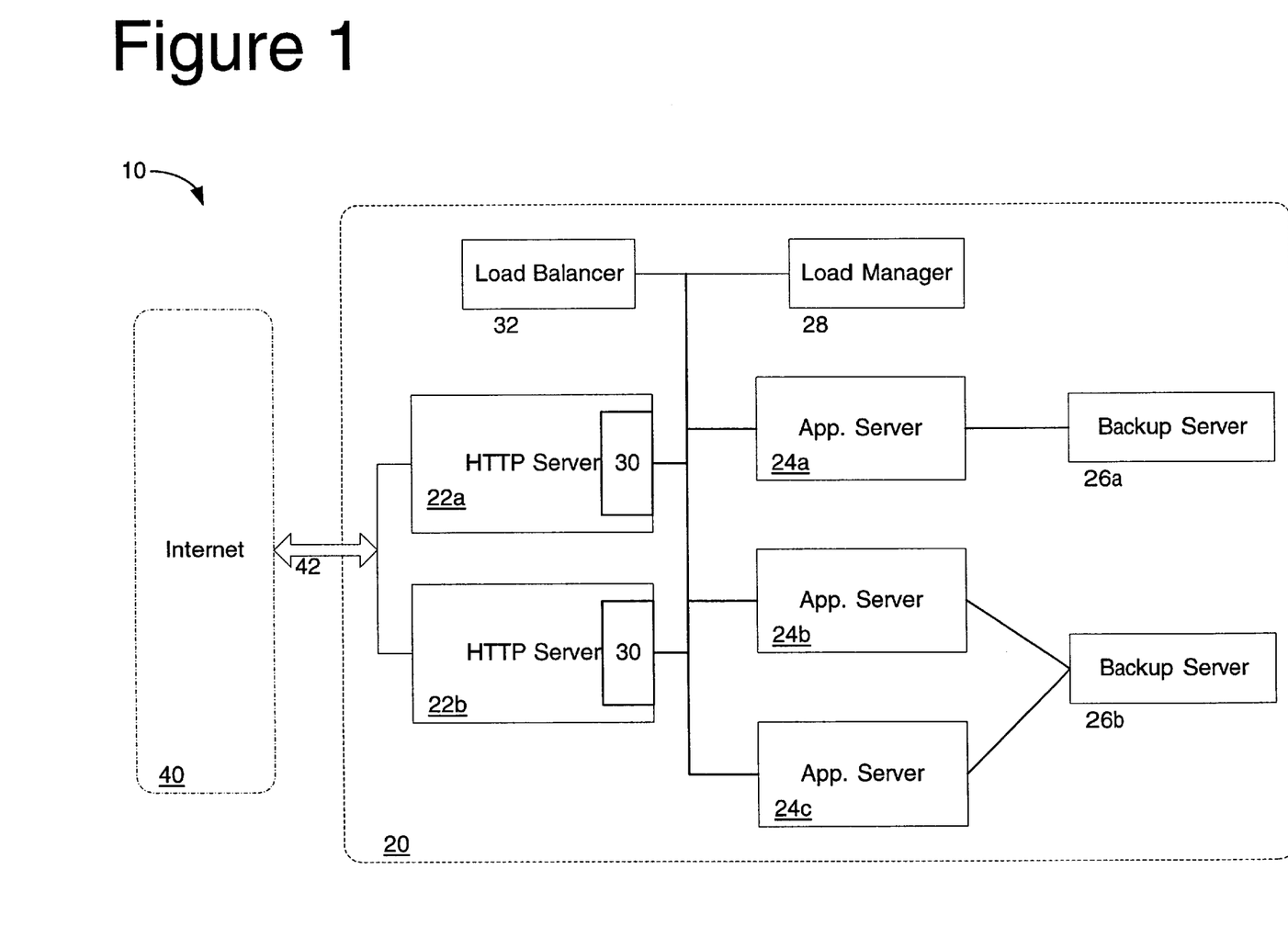
FIG. 1 is a block diagram of a computer system according to an embodiment of the present invention.

Referring to FIG. 1, portions of a computer network 10 are shown. The server portions 20 of a web site connect to the Internet (shown in block form as block 40) over connection 42. As will be described further below, the server portions 20 include HTTP servers 22 (designated as 22a and 22b), application servers 24 (designated as 24a, 24b, and 24c), backup servers 26 (designated as 26a and 26b), load manager 28, and load balancer 32. Each HTTP server 22 includes connection module 30. Although HTTP servers 22 and application servers 24 are shown separately, it is understood that the same processor could provide both an HTTP server and an application server. A method and system for handling the failure of an application server using the backup servers is described in co-pending application Ser. No. 09/335,004, which is incorporated herein by reference.

Users communicate most directly with an HTTP server 22. In one embodiment, users initially communicate with main HTTP server 22a. Main HTTP server 22a handles some requests itself and redirects other user requests to secondary HTTP server 22b. Although two HTTP servers 22 are shown in FIG. 1, it is understood that only one HTTP server 22 could be used, or more than two could be used. Alternatively, with two or more HTTP servers 22, a DNS server (which could be part of one of the HTTP servers 22) could maintain a pool of IP addresses that identify the HTTP servers, and assign an IP address to service each new user request. Suitable HTTP servers include the Netscape Enterprise or FastTrack HTTP servers, or the Microsoft IIS server.

Connection modules 30 are used to connect each HTTP server 22 to each application server 24. Preferably, the same application server 24 handles all requests for a particular user session absent failure conditions, such as those described below. Although three application servers 24 are shown in FIG. 1, it is understood that fewer or more application servers 24 could be used, depending on the needs of the system. More than one HTTP server 22 can send requests to the same application server 24. In one preferred embodiment, each application server 24 has the same content, and the load is distributed among them.

Figure 2:
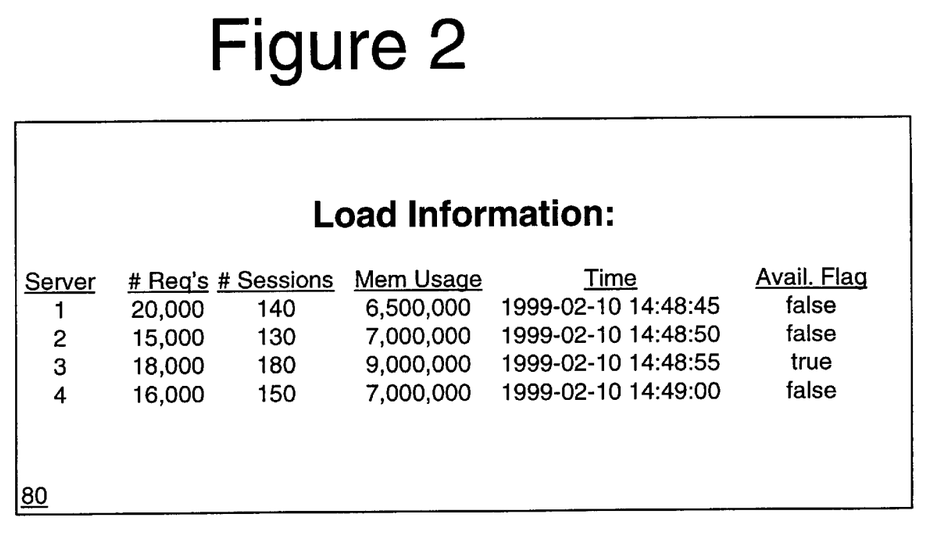
FIG. 2 is a diagram of a structure for implementing a computer system according to an embodiment of the present invention.

Load manager 28 periodically polls each application server 24 for status and load information. For example, load manager 28 may poll each application server 24 every 30 seconds. However, a shorter or longer period may be used as desired. Preferably, as shown in FIG. 2, load manager 28 obtains load information 80 from each application server 24. Load information 80 includes the total number of requests that the application server has served since it was last restarted, the current number of active sessions, the current memory usage (in terms of megabytes being used or percentage being used), a time stamp that indicates the total elapsed time (in milliseconds) since the server was last restarted, and the value of an excessive thread load flag. This information can be provided in various ways. For example, if load manager 28 receives the amount of memory being used and obtains the total memory available, it can calculate the percentage being used. If load manager 28 receives the current time and knows the time that the application server last was restarted, it can calculate the elapsed time.

Load balancer 32 keeps the current information and information from the prior polling interval. Optionally, load balancer 32 also stores information from additional prior polling intervals.

Figure 3:
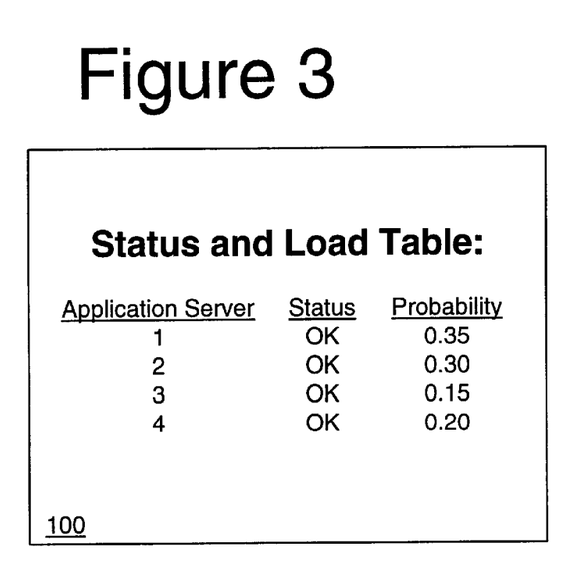
FIG. 3 is a diagram of a structure for implementing a computer system according to an embodiment of the present invention.

This information is compiled into a table 100 (shown in FIG. 3), which is available to the connection modules 30. Preferably, table 100 provides a set of probabilities, based on the status and load information, as to whether to select each application server 24. A more heavily loaded application server receives a lower probability (for example, Application Server No. 3, shown in FIG. 3) and is less likely to be selected. Although a single load manager 28 is shown in FIG. 1, multiple load managers may be active at once. A connection module 30 may obtain the information in table 100 from any active load manager, thereby providing fault-tolerance should one load manager fail. In a preferred embodiment each application server 24 contains a load manager module.

When an HTTP server 22 receives a request without a session ID, which indicates the start of a new session, the corresponding connection module 30 uses the information from table 100 to select an application module 24 to use for the new session. According to the probabilities, each server is assigned a corresponding portion of a range in which a random number may fall. For example, with the probabilities shown in FIG. 3 and assuming the selection of a random number less than one, application server 1 may be assigned 0–0.34, application server 2 may be assigned 0.35–0.64, application server 3 may be assigned 0.65–0.79, and application server 4 may be assigned 0.80–0.99. Connection module 30 selects a random number, and the server within whose range the number falls is assigned the session. The selected application server 24 assigns a new session ID to the new session. Preferably, once assigned, the session ID (and corresponding particular application server 24) is used throughout the duration of the session unless it becomes appropriate to change application servers as discussed below.

The session ID is attached to all subsequent page requests either through the request URL or through a standard HTTP cookie. When an HTTP server 22 services a subsequent request, its connection module 30 uses the session ID to determine the application server 24 that is assigned to the session. The connection module 30 then attempts to communicate with the application server 24. If successful, the request is forwarded to the application server. Uses of the session ID in conjunction with the backup servers is discussed further in co-pending application Ser. No. 09/335, 004, which is incorporated herein by reference.

Figure 4:
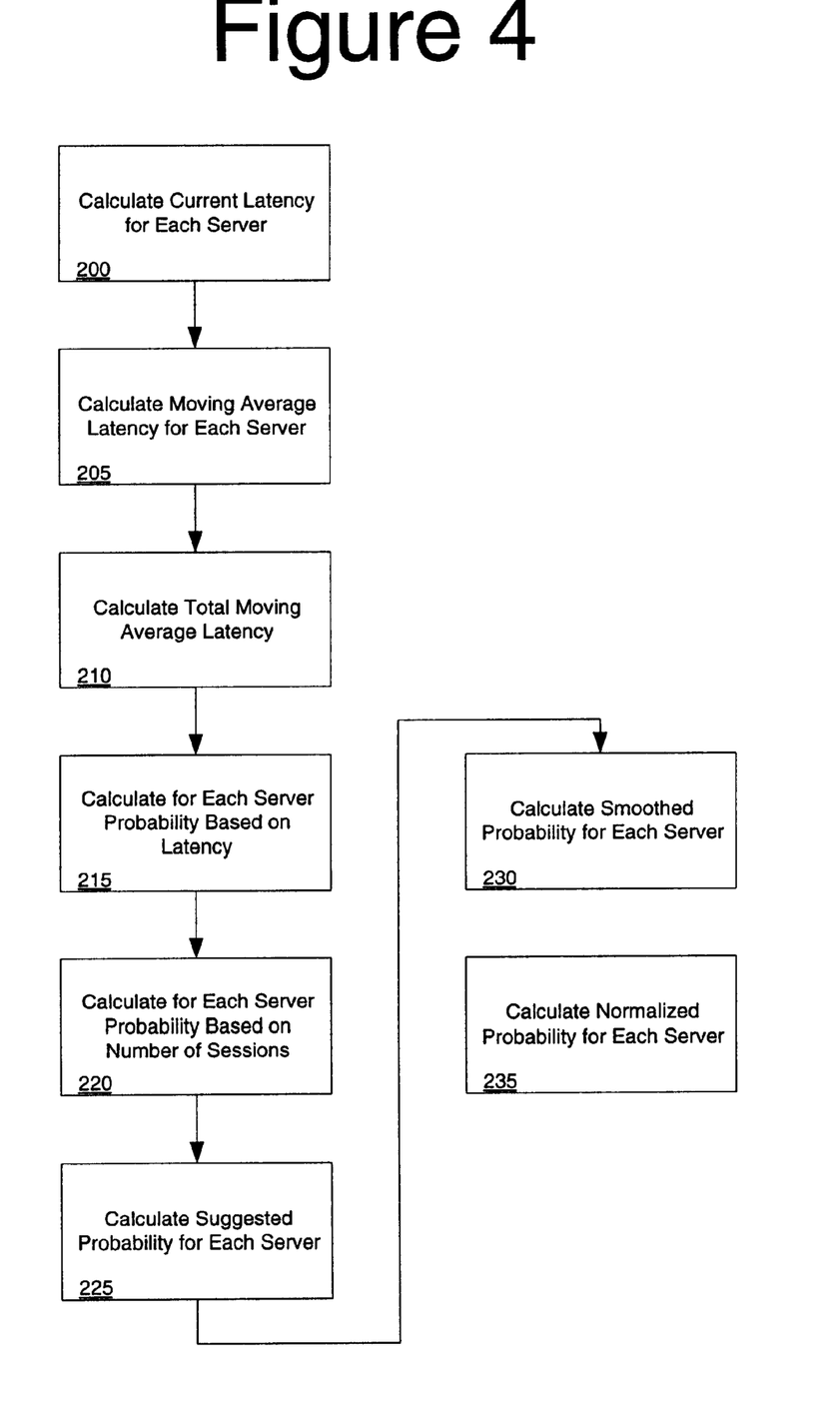
FIG. 4 is a diagram of steps performed according to an embodiment of the present invention.

In a preferred embodiment, the probabilities in table 100 are assigned in the following manner, as illustrated in FIG. 4. Initially, at step 200, load balancer 32 calculates a current latency of requests. In a preferred embodiment, the current latency of requests for each server is calculated as:

$$L(t)=[TRT(t)-TRT(t-1)]/[TRS(t)-TRS(t-1)]$$

where L(t) is the Latency of requests for the server at time interval t, TRT is the Total Request Time for the server, TRS is the Total Requests Served by the server, and the values for TRT and TRS from the current time interval t and the previous time interval (t−1) are used.

At step 205, load balancer 32 calculates a moving average for the latency of requests (MAL) for each application server as:

$$MAL(t)=MAL(t-1)+SF*[L(t)-MAL(t-1)]$$

where SF is a Smoothing Factor, which is adjustable by the user, and serves to smooth out the latency calculations. A smoothing factor of 1 would provide no smoothing based on past average latencies. Typically, the Smoothing Factor is between 0.25 and 0.5, and in a preferred embodiment has a default value of approximately 0.5. The moving average for the latency of requests thus factors in current resource usage (from the average latency) and past performance (the moving average of latency from the prior time period, which in turn was based in part on the moving average of latency from the periods before that).

After calculating the moving average for the latency of requests (MAL) for each application server, load balancer 32 calculates (at step 210) the total moving average latency (TMAL) and the total number of active sessions (TS) for all servers combined. These values are obtained by adding the moving average latency for each server to obtain the total moving average latency, and by adding the number of active sessions for each server to obtain the total number of active sessions.

The number of current active sessions provides an indication of likely future usage of a server's resources, as an active session is likely to lead to future requests for service. This proxy for future usage is combined with the calculations based on past and current usage as follows.

At step 215, load balancer 32 calculates a probability (of being selected for a new session) for each application server based on latency alone. Probability is inversely related to the proportion of total average latency that an application server has, so that the higher the latency (that is, the longer a server takes to serve a request), the lower its probability. Probability based on latency (PL) for each server i may be calculated as:

$$PLi(t)=[TMAL(t)-MALi(t)]/[(n-1)*TMAL(t)]$$

where n is the number of application servers. Alternatively, other algorithms for determining probability also may be used.

Similarly, at step 220, load balancer 32 calculates a probability for each application server based on the current number of active sessions alone. The probability should be inversely related to the proportion of total active sessions that an application server has, so that the higher the number of sessions, the lower its probability. Probability based on sessions (PS) for each server i may be calculated as:

$$PSi(t)=[TS(t)-Si(t)]/[(n-1)*TS(t)]$$

where Si(t) is the number of active sessions for server i and n is the number of application servers. Again, other algorithms may be used for determining probability.

For testing or optimization purposes, the probabilities based on latency alone and on the number of active sessions alone can be used to simulate how each factor, and various combinations of the factors, affect overall system performance.

From the probabilities based on latency and number of sessions, load balancer 32 calculates, at step 225, a suggested probability (PA) for each application server i as:

$$PAi(t)=SW*PSi(t)+(1-SW)*PLi(t)$$

where SW is a user-adjustable Smoothing Weight between 0 and 1 that determines the relative effect of the number of sessions and latency on the overall probability. If SW equals 0, then the suggested probability PA is just the probability based on latency PL. If SW equals 1, then the suggested probability PA is just the probability based on sessions PS.

At step 230, in order to smooth changes in probabilities from time interval to time interval, a user-adjustable probability smoothing factor (PSF) is used to determine the relative effects of the prior and current probabilities in calculating a smoothed probability (PB) for each application server i as:

$$PBi(t)=PBi(t-1)+PSF*[PAi(t)-PBi(t-1)]$$

Finally, at step 235, a probability (P) for each application server i is calculated by normalizing each smoothed probability so that sum of the total probabilities equals 1.

Preferably, load balancer also adjusts for extreme high and low loads. Although the actual numbers depend on the particular application, and are affected by the particular application servers used and the number of application servers used, an application server typically may have between 100 and 10,000 active sessions. Even with the smoothing factors, very low loads (such as when an application server starts up) could cause an undue number of sessions to be assigned to a single application server. Thus, at step 200, if the latency of requests for any application server is less than a user-adjustable minimum value MINL, then the latency of requests is set as the minimum value MINL. Similarly, at step 220, if the number of sessions for any application server is less than a user-adjustable minimum value MINS, then the number of sessions for that server is set to be the minimum value MINS. By setting MINL and/or MINS to be 0, no adjustment is made to the values for the latency of requests or the number of sessions, respectively.

If an application server has a very high load, it is preferable to stop assigning new sessions to that server. Thus, at step 230 (or at other steps, as desired), the probability for a specific application server may be set to 0 if the latency of requests exceeds a user-adjustable maximum value MAXL or the number of sessions exceeds a user-adjustable maximum value MAXS. In addition to setting maximum values, the user can control whether the maximum limits are used. If a maximum latency flag BMAXL is set, then load balancer 32 tests for whether the latency of requests exceeds the maximum value MAXL. If a maximum sessions flag BMAXS is set, then load balancer 32 tests for whether the number of sessions exceeds the maximum value MAXS.

Even when using a load balancing mechanism, the load on an application server can become excessive or the performance of an application server can become degraded. Under these circumstances, to provide for better response times, a session can be transferred to another application server, such as in the manner described in co-pending application Ser. No. 09/335,004, and future sessions are not sent to the degraded server.

Figure 5:
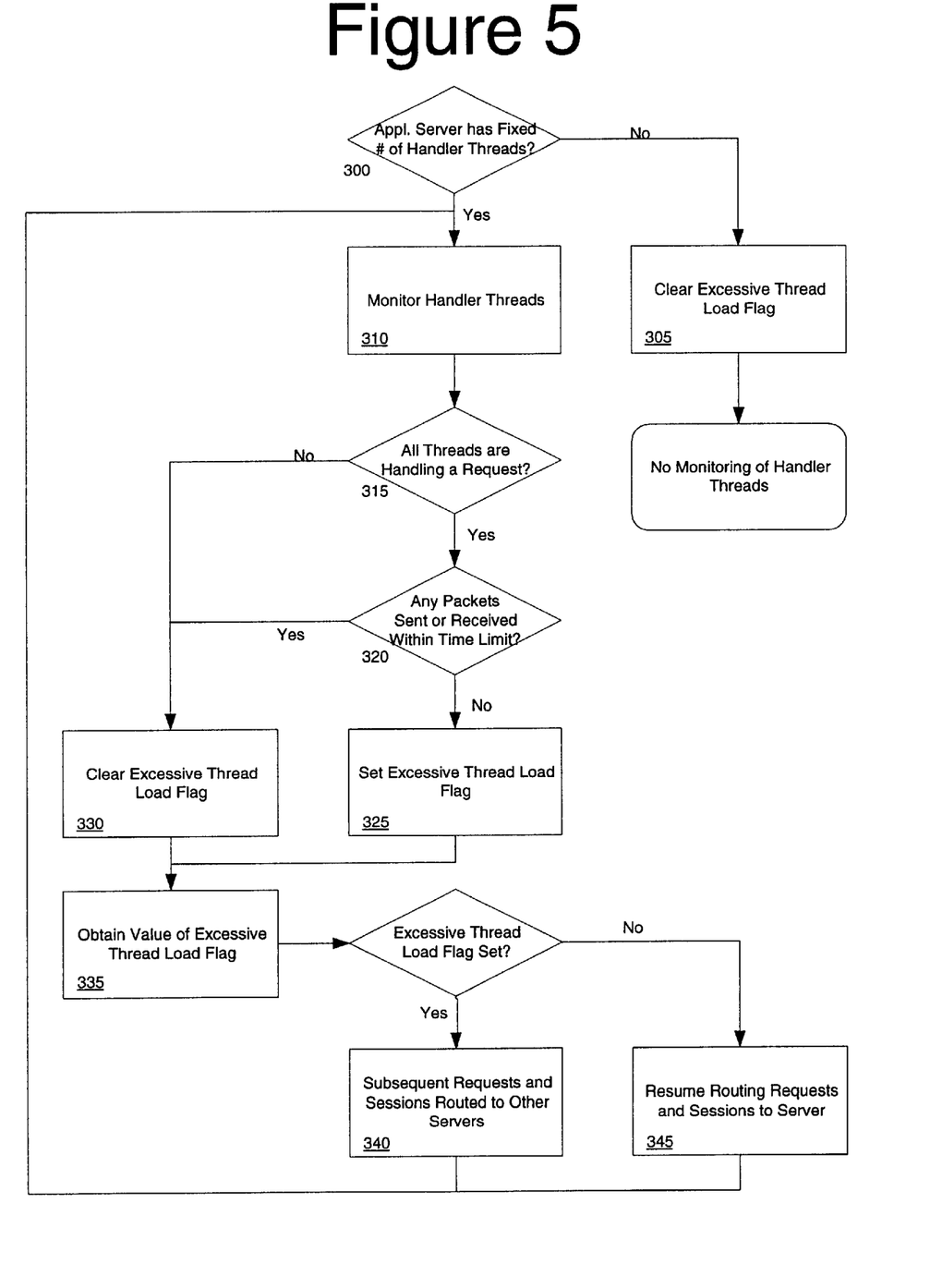
FIG. 5 is a diagram of steps performed according to an embodiment of the present invention.

As shown in FIG. 5, an application server 24 may be configured to have a fixed number of handler threads (step 300). If so, the application server 24 monitors the threads (step 310). If all of the threads are handling a request (step 315) and none of the threads have received or sent a packet within a configurable time limit (step 320), the application server 24 sets a Simple Network Management Protocol (SNMP) flag to indicate excessive thread load (step 325). Otherwise, the SNMP flag is cleared (step 330). Similarly, the SNMP flag is cleared (step 305) if the application server does not have a fixed number of handler threads.

Load manager 28, while polling each application server 24 for load and status information, also receives the status of the flag (the last field in FIG. 2). Connection module 30, in turn, obtains the value of the flag from load manager 28 (step 335). If the flag is set, then subsequent requests for sessions associated with that application server 24 are routed to a different application server (step 340). In addition, if the SNMP flag is set, then load balancer 32 (at step 230 in FIG. 4) sets the probability for that application server to 0.

Subsequently, when the flag is cleared (at step 330) because one or more threads have received or sent a packet and/or are no longer handling a request, connection module 30 will, at step 345, stop routing requests for sessions associated with that application server to different application servers. Also, load balancer 32 will no longer set the probability for that application server to 0, and it will resume receiving new sessions.

Preferably, a similar process for stopping requests or new sessions occurs if the memory usage exceeds a user-configurable limit. If the memory usage information obtained by load manager 28 indicates that the memory usage exceeds the user-configured limit for a particular application server 24, connection module 30 obtains the identity of that application server 24. Consequently, subsequent requests for sessions associated with that application server 24 are routed to a different application server. Also, in this case, load balancer 32 sets the probability for that application server to 0. As described above, when the memory usage falls below the limit (or a separate limit to avoid rapid fluctuations), connection module 30 stops routing requests to different application servers and load balancer 32 stops setting the probability for that application server to 0.

In a preferred embodiment, the connection module 30 has a third failover mechanism. If connection module 30 is unable to connect to an application server 24 after a time out period, then that connection module routes subsequent requests for sessions associated with that application server to a different application server. In this case, because the problem may be in the connection between the connection module and the application server, requests from other connection modules and probabilities for future sessions are not affected. After a user-configurable back-off period, connection module 30 again attempts to connect requests to the application server.

Figure 6:
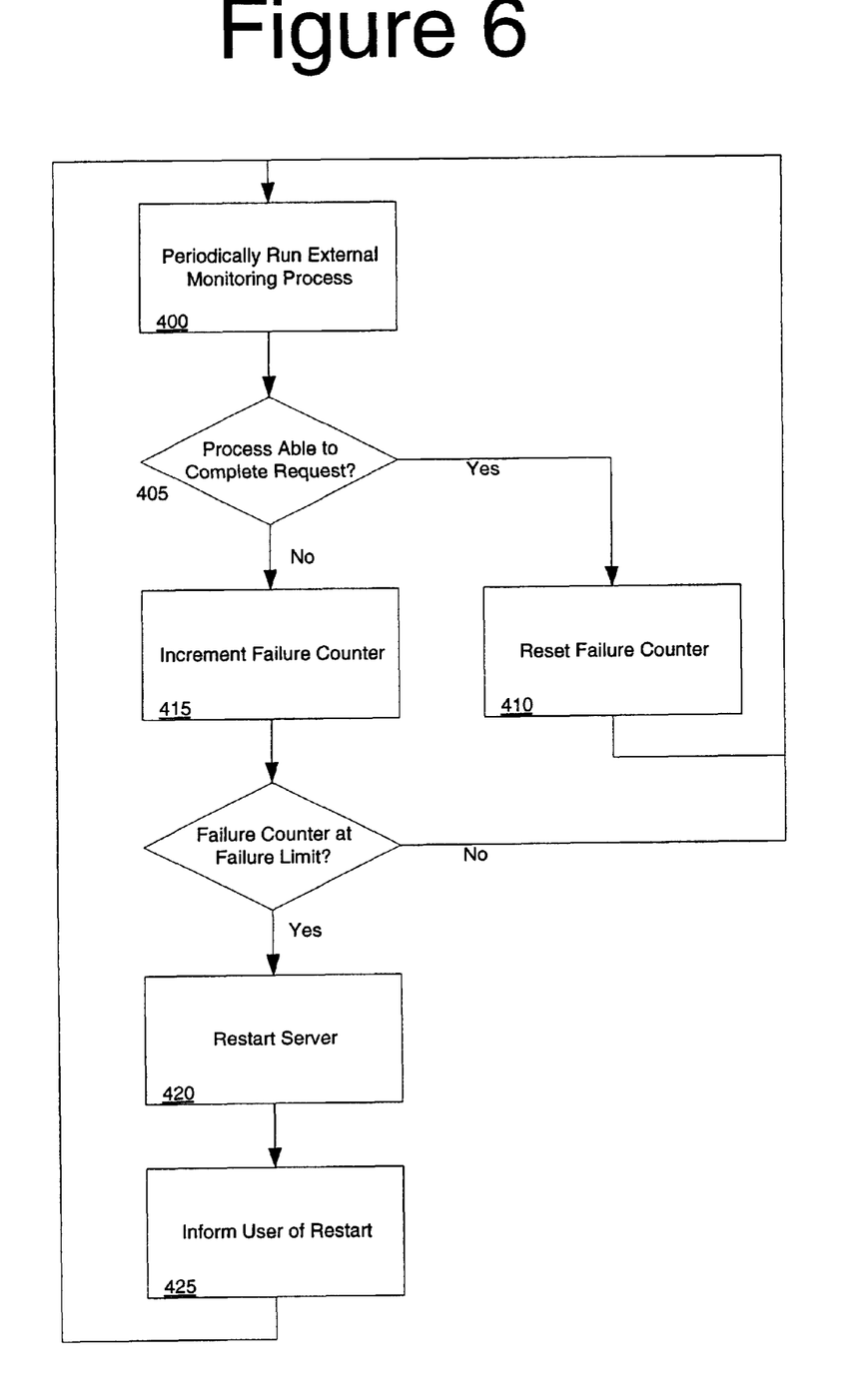
FIG. 6 is a diagram of steps performed according to an embodiment of the present invention.

Each application server 24 preferably also has a mechanism for restarting an application server that is not responding to requests. As shown in FIG. 6, each application server 24 runs an external monitoring process at fixed intervals (step 400), such as every 30 seconds. The external monitoring process attempts to connect to the application server on which the process is running and request a predefined monitoring page (step 405). This is done by running the request through a web or HTTP server 22, but encoded so that the request automatically is routed back to the application server on which the process is running. If the request succeeds, a failure counter is reset (step 410). If the request fails, the process increments the failure counter (step 415). If the failure counter reaches a user-configurable failure number, such as three consecutive failures, the process sends a message to the server to cause it to restart (step 420). In addition, the process sends an electronic mail message to the user (step 425), informing the user that an automatic restart has been initiated.

For further load management, each connection module 30 includes a mechanism for failing over to another web or HTTP server if the connection module is unable to connect to any application server. If the connection module is unable to connect to any application server 24, then it responds to the browser that initiated the request by redirecting the browser to another web server.

While there have been shown and described examples of the present invention, it will be readily apparent to those skilled in the art that various changes and modifications may be made therein without departing from the scope of the invention as defined by the appended claims. For example, different algorithms can be used to calculate the latency, moving average latency, and probabilities. Accordingly, the invention is limited only by the following claims and equivalents thereto.

What is claimed is:

1. A method for balancing load among a plurality of servers on a computer system comprising the steps of:

obtaining a value for current resource usage for each server;

obtaining a value for expected future resource usage for each server;

for each server, determining a load balancing factor from the value for current resource usage and the value for future resource usage; and assigning sessions to the plurality of servers according to the relative values of the load balancing factors for each server;

wherein the step of determining a load balancing factor further includes determining a load balancing factor from the value for current resource usage, the value for future resource usage, and at least one prior value for current resource usage, and further includes determining a probability for each server that future sessions will be assigned to such server.

2. A method for balancing load among a plurality of servers on a computer system comprising the steps of:

obtaining a value for current resource usage for each server;

obtaining a value for expected future resource usage for each server;

for each server, determining a load balancing factor from the value for current resource usage and the value for future resource usage; and assigning sessions to the plurality of servers according to the relative values of the load balancing factors for each server;

wherein the step of determining a load balancing factor includes determining a load balancing factor from the value for current resource usage, the value for future resource usage, and at least one prior value for current resource usage, and further includes obtaining a first probability factor for each server from the value for current resource usage and at least one prior value for current resource usage, obtaining a second probability factor for each server from the value for future resource usage, and determining a combined probability factor for each server from the first probability factor and the second probability factor.

3. A method for balancing load among a plurality of servers on a computer system comprising the steps of:

obtaining a value for current resource usage for each server;

obtaining a value for expected future resource usage for each server;

for each server, determining a load balancing factor from the value for current resource usage and the value for future resource usage; and assigning sessions to the plurality of servers according to the relative values of the load balancing factors for each server;

wherein the step of obtaining a value for current resource usage for each server includes obtaining a measure of current resource usage from each server; and if the measure of current resource usage is less than a first minimum usage value, assigning as the value for current resource usage the first minimum usage value, and otherwise assigning as the value for current resource usage the measure of current resource usage.

4. The method of claim 3, wherein the step of obtaining a value for current resource usage for each server includes obtaining a measure of expected future resource usage for each server; and if the measure of expected future resource usage is less than a second minimum usage value, assigning as the value for expected future resource usage the second minimum usage value, and otherwise assigning as the value for expected future resource usage the measure of expected future resource usage.

5. A method for balancing load among a plurality of servers on a computer system comprising the steps of:

obtaining a value for current resource usage for each server;

obtaining a value for expected future resource usage for each server;

for each server, determining a load balancing factor from the value for current resource usage and the value for future resource usage; and assigning sessions to the plurality of servers according to the relative values of the load balancing factors for each server;

wherein the step of determining for each server a load balancing factor includes assigning a load balancing factor for a server so as to preclude assigning sessions to the server if the value for expected future resource usage for the server exceeds a future maximum usage value.

6. A method for balancing load among a plurality of servers on a computer system comprising the steps of:

obtaining a value for current resource usage for each server;

obtaining a value for expected future resource usage for each server;

for each server, determining a load balancing factor from the value for current resource usage and the value for future resource usage; and assigning sessions to the plurality of servers according to the relative values of the load balancing factors for each server;

wherein the step of determining for each server a load balancing factor includes assigning a load balancing factor for a server so as to preclude assigning sessions to the server if all of the threads available to the server are handling requests and the server has not received or sent a packet within a configured time interval.

* * * * *